J. W. WHALEN.
FISHING TACKLE.
APPLICATION FILED JUNE 25, 1917.
1,255,255.
Patented Feb. 5, 1918.
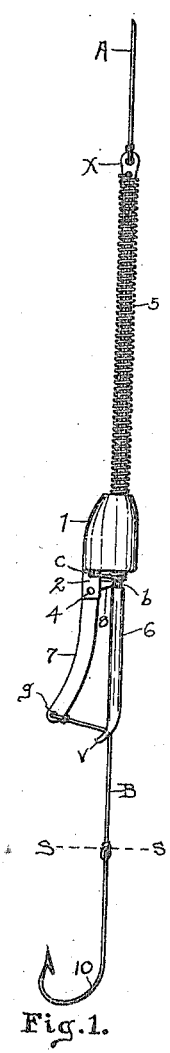
Fig. 1.
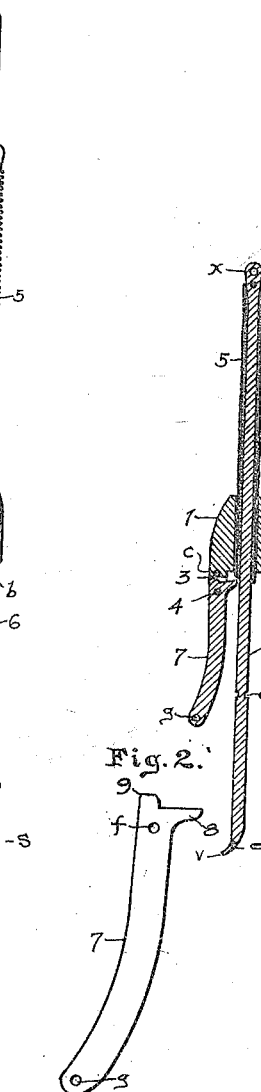
Fig. 2.
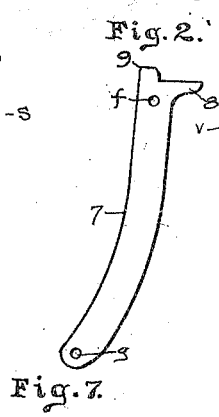
Fig. 7.
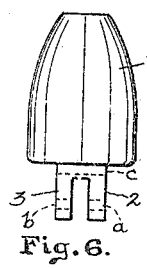
Fig. 5.
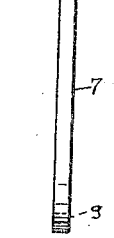
Fig. 6.
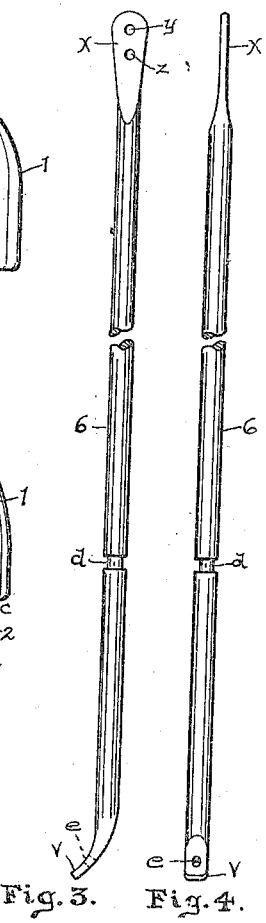
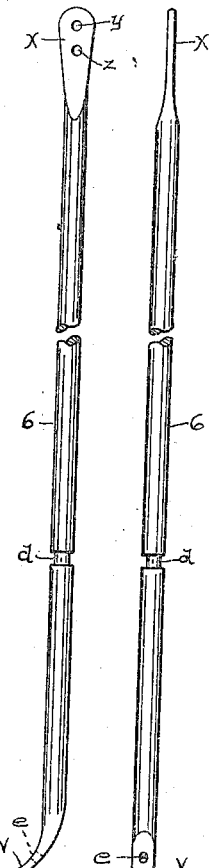
Fig. 3.   Fig. 4.
Fig. 8.
Witness:
Roy E. Fryar.
Inventor,
James W. Whalen;
By Robert W. Caudle
Attorney.

UNITED STATES PATENT OFFICE.

JAMES W. WHALEN, OF RICHMOND, INDIANA, ASSIGNOR OF ONE-HALF TO WILLIAM ESTEL MERRYMAN, OF RICHMOND, INDIANA.

FISHING-TACKLE.

1,255,255.  Specification of Letters Patent.  Patented Feb. 5, 1918.

Application filed June 25, 1917. Serial No. 176,691.

*To all whom it may concern:*

Be it known that I, JAMES W. WHALEN, a citizen of the United States, residing in the city of Richmond, in the county of Wayne and State of Indiana, have invented certain new and useful Improvements in Fishing-Tackle, of which the following is a full, clear, and comprehensive specification and exposition, the same being such as will enable others to make and use the same with exactitude.

The object of my invention, broadly speaking, is to provide a fishing tackle which will be strong and durable in construction, neat and attractive in appearance, easily operated and controlled, effective and advantageous in practice, and which can be manufactured and sold at a comparatively low price.

The particular objects of this invention are, to provide fishing tackle adapted to be interposed in the line extending from a pole to a hook whereby it will act as and in the place of the usual sinker; also being adapted to act as a resiliency between the pole and the hook; but more particularly being adapted to be set and then when a slight downward pull is exerted upon the hook it is adapted to be tripped or thrown whereby a fish will be automatically hooked or engaged, and that without movement of the pole on the part of the fisherman.

The preferred means for carrying out my invention in a practical and a mechanical manner is shown in the accompanying drawings, in which—Figure 1 is a side elevation of the complete device, showing the same in set position ready for operation. Fig. 2 is a central longitudinal section of the main portion of the device, showing the same in open or unset position. Fig. 3 is a side elevation of the stem alone, and Fig. 4 is the same as Fig. 3, except that the stem is shown turned at right-angles to that in Fig. 3. Fig. 5 is a side elevation of the cone or body of the device, and Fig. 6 is the same except that it is taken at right angles to that of Fig. 5. Fig. 7 is an enlarged side elevation of the lever or trigger, and Fig. 8 is an edge view of the same. Figs. 3, 4, 5, 6, 7 and 8 are taken on an enlarged scale from that in which they are shown in Figs. 1 and 2. Figs. 1 and 2 show the relative sizes of the various parts.

Similar indices denote like parts throughout the several views.

Referring now to the drawings in detail: Numeral 1 denotes the cone-shaped body, which is round in cross section, its lower end being its largest diameter from which it tapers upwardly. A comparatively large round aperture extends entirely through the body longitudinally and axially thereof, the same being slightly to one side of the center of the body to provide for the downwardly extending ears 2 and 3 which are identical with each other, and they are integral with the body 1. The said ears are spaced apart, with the space therebetween in alinement with said aperture, but said ears are located adjoining the periphery of the body and some distance from said aperture. Apertures $a$ and $b$ are alined with each other and they are formed through the lower portions of the respective ears 2 and 3, and they are adapted to have secured therein the pin 4 which extends across the space between said ears. Formed across through the base of said ears, and parallel with the apertures $a$ and $b$, is the aperture $c$, which is for a purpose hereinafter explained.

Numeral 5 denotes a comparatively long helical spring, whose lower portion fits in said aperture in the body, and its lower end is secured in said aperture $c$.

Numeral 6 denotes the stem, intermediate of which is formed a square-shouldered notch $d$. The said stem fits in the spring 5 which is coiled therearound as shown, and the stem extends both above and below said body, substantially as shown.

The upper end portion of the stem is flattened, as shown at $x$. Through the flattened portion $x$ are formed two apertures, $y$ and $z$. The upper end of the spring 5 is secured in the aperture $z$, and in the aperture $y$ is secured one end of the upper line A which line extends up to a pole (not shown). Also the lower portion of the stem is flattened and curved to one side, as at $v$, and an eye $e$ is formed therethrough as shown in Fig. 2.

Numeral 7 denotes the lever or trigger, which is formed of flat material, and it is slightly curved outward edgewise, as shown in Fig. 7. Formed through the upper portion of the lever 7 is an aperture $f$, and through its lower portion is the aperture $g$. The thickness of the lever 7 is such as to fit between the ears 2 and 3 and it is mounted in place by the pin 4 on which it is adapted to swing. From the upper inner corner of the lever 7 is the inwardly projecting tooth 8, which is adapted to engage in the notch $d$; and from the upper outer corner of the lever 7 is the upwardly projecting stop 9 which may engage the shoulder between the ears 2 and 3, in order to prevent the lever from swinging outward beyond a predetermined point or position.

It will be observed that the lower end of the spring engages the top of the tooth 8, thereby normally retaining the end of the stop 9 in contact with the shoulder of the ears, and holding the tooth normally in horizontal position.

Letter B denotes the lower line, one end of which is secured in the aperture $g$, from which it passes freely through the aperture or eye $e$, and then extends downward where it is secured in the eye of the hook 10.

*Modus operandi:* Before the device is set for operation, as in Fig. 2, the convolutions of the spring are contacted with each other, which will cause the lower end of the portion $v$ of the stem to extend approximately to the dotted line $s$—$s$ as indicated in Fig. 1. In the position just stated the spring 5 would merely act as a resiliency, that is permitting the hook 10 to be pulled downward a slight distance without moving the line A.

Desiring now to set the device, one has only to grasp the body 1 and then pull upward on the line A, thereby moving the stem upward through the body until the tooth 8 engages in the notch $d$ which, manifestly, will lock the stem in that position against the contraction of the spring 5.

It will now be seen that if the hook 10 be baited, in the usual manner, and the device is suspended in the water it will hang in the position shown in Fig. 1. Then if the bait be taken by a fish a slight pull by the fish will cause the line B to pull inward on the lower end of the lever 7, which will eventuate in withdrawing the tooth 8 from the notch $d$, thereby allowing the spring 5 to expand, and as the line A is secured, it is evident that the body 1 will shoot upwardly, thereby jerking the hook securely into the fish and thereby accomplishing the main desideratum, and after the fish is secured on the hook as stated then the spring will act as a cushion against the struggling of the fish and thereby prevent the line from breaking.

I desire that it be understood that various changes may be made in the several details of the construction, from that shown and described, without departing from the spirit of the invention, and without sacrificing any of the advantages thereof.

Having now fully shown and described my invention, what I claim and desire to secure by Letters Patent of the United States, is—

1. In combination with fishing tackle including an upper line which is relatively stationary, a lower line, and a hook secured to the lower end of the lower line, a device interposed between said lines and comprising a stem to the upper end of which the lower line is attached, a body through which said stem is adapted to slide, a spring normally holding said body upward to its limit, a lever pivoted to the body and to which the upper end of the lower line is attached, and a tooth protruding from said lever and adapted to engage in a notch in the stem to hold the body downward to its limit against the resiliency of said spring.

2. A fishing tackle comprising a cone-shaped body, a lever pivoted at one end to the lower end of the body, a tooth integral with said lever, a stem adapted to slide up and down through said body and having a notch formed therein intermediate of its length in which said tooth is adapted to engage, a spring surrounding said stem and adapted to normally pull said body upward when said lever is moved inward to withdraw the tooth from said notch, a line extending downward from the free end of the lever, and a line extending upward from the upper end of the stem.

3. A fishing tackle comprising in combination with an upper line adapted to extend to a pole, a lower line extending to a hook, the stem having its upper end attached to the lower end of the upper line, a body surrounding said stem and adapted to slide up and down thereon, a spring surrounding the upper portion of the stem one end of which is secured to the upper end of the stem and the other end secured to said body, a lever pivoted to the lower end of the head and curved away from the lower portion of the stem, a tooth extending inward from the upper end of the lever and adapted to engage in a notch in the stem to hold the stem upward to its limit against the contraction of said spring, the lower line being secured to the free end of the lever and passing freely through an eye in the lower end of the stem and then extending downward to the hook, all substantially as shown and described.

In testimony whereof I have hereunto subscribed my name to this specification in the presence of two subscribing witnesses

JAMES W. WHALEN.

Witnesses:
WILLIAM ESTEL MERRYMAN,
RORT. W. RANDLE.